(12) United States Patent
Berg et al.

(10) Patent No.: US 6,704,256 B2
(45) Date of Patent: Mar. 9, 2004

(54) CONTINUOUS FLEXIBLE CONNECTION FOR MINIATURE OPTICAL HEAD

(75) Inventors: Thomas E. Berg, Fort Collins, CO (US); Scott D. Abrahamson, Longmont, CO (US); Peter J. Raymond, Erie, CO (US)

(73) Assignee: DPHI Acquisitions, Inc., Boulder, CO (US)

(*) Notice: Subject to any disclaimer, the term of this patent is extended or adjusted under 35 U.S.C. 154(b) by 260 days.

(21) Appl. No.: 09/802,708

(22) Filed: Mar. 8, 2001

(65) Prior Publication Data

US 2003/0167154 A1 Sep. 4, 2003

Related U.S. Application Data

(63) Continuation-in-part of application No. 09/679,941, filed on Oct. 4, 2000.

(51) Int. Cl.[7] .............................. G11B 5/48; G11B 21/16
(52) U.S. Cl. ............................. 369/44.19; 360/264.2; 360/245.9; 369/244
(58) Field of Search .................. 369/244, 44.14, 369/44.15, 44.19; 360/264.1, 264.2, 264.5, 266.3, 294.7, 245.8, 245.9

(56) References Cited

U.S. PATENT DOCUMENTS

| | | | | |
|---|---|---|---|---|
| 4,669,073 A | * | 5/1987 | Wakabayashi et al. ... | 369/44.19 |
| 4,965,684 A | | 10/1990 | Stefansky ................ | 360/78.12 |
| 5,010,246 A | | 4/1991 | Tsuyuguchi et al. ........ | 250/216 |
| 5,325,252 A | * | 6/1994 | Yagi et al. ................ | 360/236.7 |
| 5,446,240 A | * | 8/1995 | Hayakawa et al. ........... | 174/69 |
| 6,052,357 A | | 4/2000 | Ogawa et al. ............... | 369/215 |

FOREIGN PATENT DOCUMENTS

| | | | | |
|---|---|---|---|---|
| EP | 0 862 168 | | 9/1998 | .......... G11B/7/085 |
| JP | 05109099 A | * | 4/1993 | .......... G11B/7/09 |
| JP | 06215391 A | * | 8/1994 | .......... G11B/7/09 |
| JP | 06215530 A | * | 8/1994 | .......... G11B/25/04 |
| JP | 07037662 A | * | 2/1995 | .......... H01R/35/02 |
| JP | 08147741 A | * | 6/1996 | .......... G11B/7/12 |
| JP | 08293172 A | * | 11/1996 | .......... G11B/21/02 |
| JP | 09027175 A | * | 1/1997 | .......... G11B/21/02 |
| JP | 09054999 A | * | 2/1997 | .......... G11B/11/10 |
| JP | 10228656 A | * | 8/1998 | .......... G11B/7/09 |
| JP | 11242860 A | * | 9/1999 | .......... G11B/21/02 |

OTHER PUBLICATIONS

U.S. patent application Ser. No. 09/457,104, filed Dec. 7, 1999, Freeman et al.
U.S. patent application Ser. No. 09/544,370, filed Apr. 6, 2000, Wilson.
U.S. patent application Ser. No. 09/557,284, filed Apr. 25, 2000, Freeman et al.
U.S. patent application Ser. No. 09/679,941, filed Oct. 4, 2000, Freeman et al.

* cited by examiner

*Primary Examiner*—William Klimowicz
(74) *Attorney, Agent, or Firm*—MacPherson Kwok Chen & Heid LLP

(57) ABSTRACT

An optical assembly including a service loop extended from a focus section of an actuator arm. A portion of the service loop bends when a tracking section of the actuator arm rotates around a tracking axis while a portion of the flex circuit twists when the focus section of the actuator arm rotates around a focus axis.

10 Claims, 13 Drawing Sheets

CONTINUOUS FLEXIBLE CONNECTION FOR MINIATURE OPTICAL HEAD

CROSS-REFERENCE TO RELATED APPLICATIONS

This application is a continuation-in-part of U.S. application Ser. No. 09/679,941, filed Oct. 4, 2000, which is commonly owned and incorporated by reference herein in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCE TO CD-ROM APPENDIX AND APPENDIX A

A CD-ROM Appendix containing a computer program listing is submitted on a compact disc, which is herein incorporated by reference in its entirety. The total number of compact discs including duplicates is two. Appendix A, which is part of the present specification, contains a list of the files contained on the CD-ROM Appendix.

BACKGROUND

1. Field of the Invention

The present invention relates to a system that connects an optical head to additional electronics in an optical drive.

2. Description of Related Art

A conventional optical drive (e.g., a compact disk player) typically includes a stationary optical unit, a movable optical unit, and an actuator. The stationary optical unit generally includes a laser diode, a half mirror, and a photodetector. The laser diode generates a light beam that is reflected by the half mirror onto the movable optical unit. The movable optical unit typically includes an objective lens that focuses the light beam on a spinning optical disk.

The actuator aligns the movable optical unit with the tracks of the optical disk so that the light beam reflects off the lands and pits of the tracks. The reflected light beam travels back through the movable optical unit and back to the stationary optical unit. The light beam is transmitted through the half mirror onto the photodetector where the varying intensity of the light is changed to electrical signals.

Optical drives are becoming smaller so they can be integrated into portable devices including laptop computers and personal digital assistants (PDAs). Close arrangement and integration of components help to miniaturize optical drives. For example, the stationary and movable optical units described above can be integrated into a single component (an integrated optical head) called "optical pickup unit" or "OPU". The OPU can be mounted on a small actuator arm that places the OPU over the tracks of the spinning medium with relatively small forces.

The miniaturization of the optical drive creates new design restraints on the flex circuit that carries signals to and from the OPU. Depending its shape and the location from which it departs from the actuator arm, the flex circuit may constrain or disturb the movement of the actuator arm carrying the OPU. Accordingly, what is needed is a system that connects the OPU to the remaining electronics of the optical drive without impinging on the motion of the actuator arm.

SUMMARY

In one embodiment of the invention, an optical assembly includes a base plate and an actuator arm. The actuator arm includes a tracking section pivotally mounted around a tracking axis to the base plate, and a focus section pivotally mounted around a focus axis to the tracking section. A proximate end of a service loop extends from the focus section while a distal end of the service loop is mounted to the base plate. When the tracking section rotates around the tracking axis, at least a portion of the service loop bends. When the focus section rotates around the focus axis, at least a portion of the service loop twists.

In another embodiment of the invention, a method predicts the shape of a service loop that does not rotate the actuator arm from a resting position. The method uses a number of beam elements deflected by the actuator arm to simulate the shape of the service loop. In order for the service loop not to rotate the actuator arm, the method assumes that the actuator arm applies an equivalent force through the rotation axis. A user provides a mounting point (the point where a first end of the service loop is mounted to a base plate), a mounting angle (the angle at which the first end of the service loop is mounted to the base plate), a departure point (the point where a second end of the service loop is mounted to the actuator arm), a departure angle (the angle at which the second end of the service loop is mounted to the actuator arm), the total number of the beam elements, and the beam stiffness. The user also provides initial values for the beam length and the magnitudes of the X and Y components of the force applied by the actuator arm. For each beam element, the method calculates a start position, a start angle (the angle at which the start of the beam is oriented), an end position, and a finish angle (the angle at which the end of the beam is oriented under deflection). If the end position and the finish angle of the last beam element do not match the desired end position and angle of the service loop, the method repeats the above steps with new values for at lest one of the beam length and the magnitudes of the X and Y components.

In yet another embodiment, a method calculates the restoring torque when the actuator arm is rotated away from its resting position. Unlike the above method, this method assumes that a moment exists around the rotation axis. In one implementation, the moment around the rotation axis is expressed as the product of the Y component and its X direction offset from the rotation axis. Thus, the user provides initial values for the offset of the Y component and the magnitudes of the X and Y components. The user also provides the mounting point, the mounting angle, the departure point, the departure angle, the total number of the beam elements, the beam stiffness, and the beam length. For each beam element, the method calculates a start position, a start angle, an end position, and a finish angle. If the position of the last beam element does not match the desired end position and angle of the service loop, the method repeats the above steps with new values for at least one of the offset of the Y component and the magnitudes of the X and Y components.

BRIEF DESCRIPTION OF THE DRAWINGS

Use of the same reference symbols in different drawings indicates similar or identical items.

DETAILED DESCRIPTION

Figure 1:
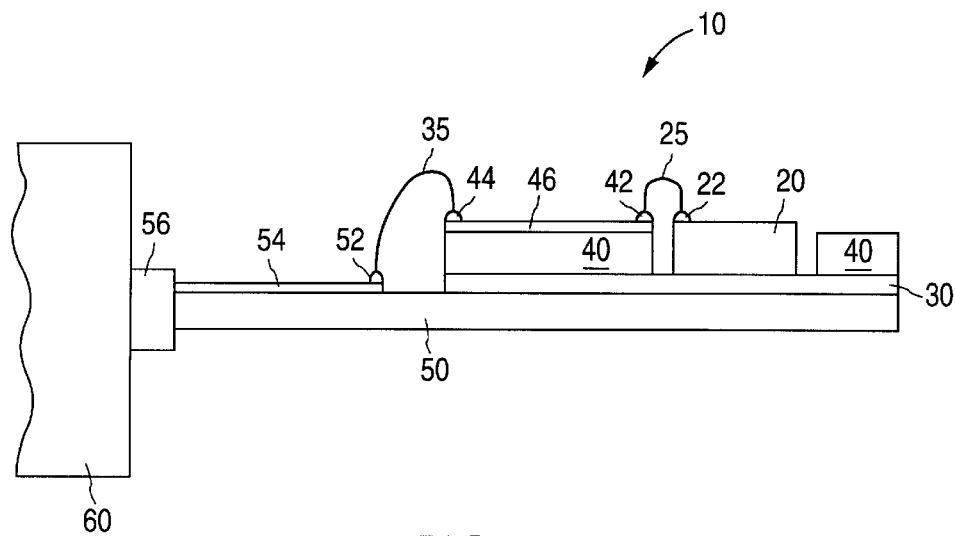
FIG. 1 illustrates a side view of an optical assembly.

FIG. 1 illustrates an assembly 10 used to connect an OPU 20 to a printed circuit board 60 (or electronics of an optical drive). OPU 20 is mounted atop a copper plate 30 through a cutout of a fiberglass layer 40. Fiberglass layer 40 includes pad 42, pad 44, and trace 46. Pad 42 of fiberglass layer 40 is coupled to pad 22 of OPU 20 via a bond wire 25. Plate 30 is mounted atop a flexible circuit 50 (or vice versa). Flexible circuit 50 includes pad 52, trace 54, and a connector 56. Pad 44 of fiberglass layer 40 is coupled to pad 52 of flexible circuit 50 via a solder joint 35. Flexible circuit 50 is next coupled to a printed circuit board 60 via connector 56.

Assembly 10 has several disadvantages. Each of the wire bonds and solder joints in assembly 10 forms a point of failure that may break during use. Thus, the many wire bonds and solder joints in assembly 10 create multiple points of failure. Each of the wire bonds and solder joints must be formed during fabrication. Thus, the many wire bonds and solder joints increase fabrication cost. Solder joints also require large pads, thereby increasing the overall size of the fiberglass and flexible circuit layers. Assembly 10 is also constructed from multiple layers of silicon, fiberglass, copper, and flex circuit that increase the overall weight and volume of the optical drive. Accordingly, there is a need for a method and a system to connect the OPU to the remaining electronics of the optical drive while improving reliability and minimizing weight and volume.

Figure 2A:
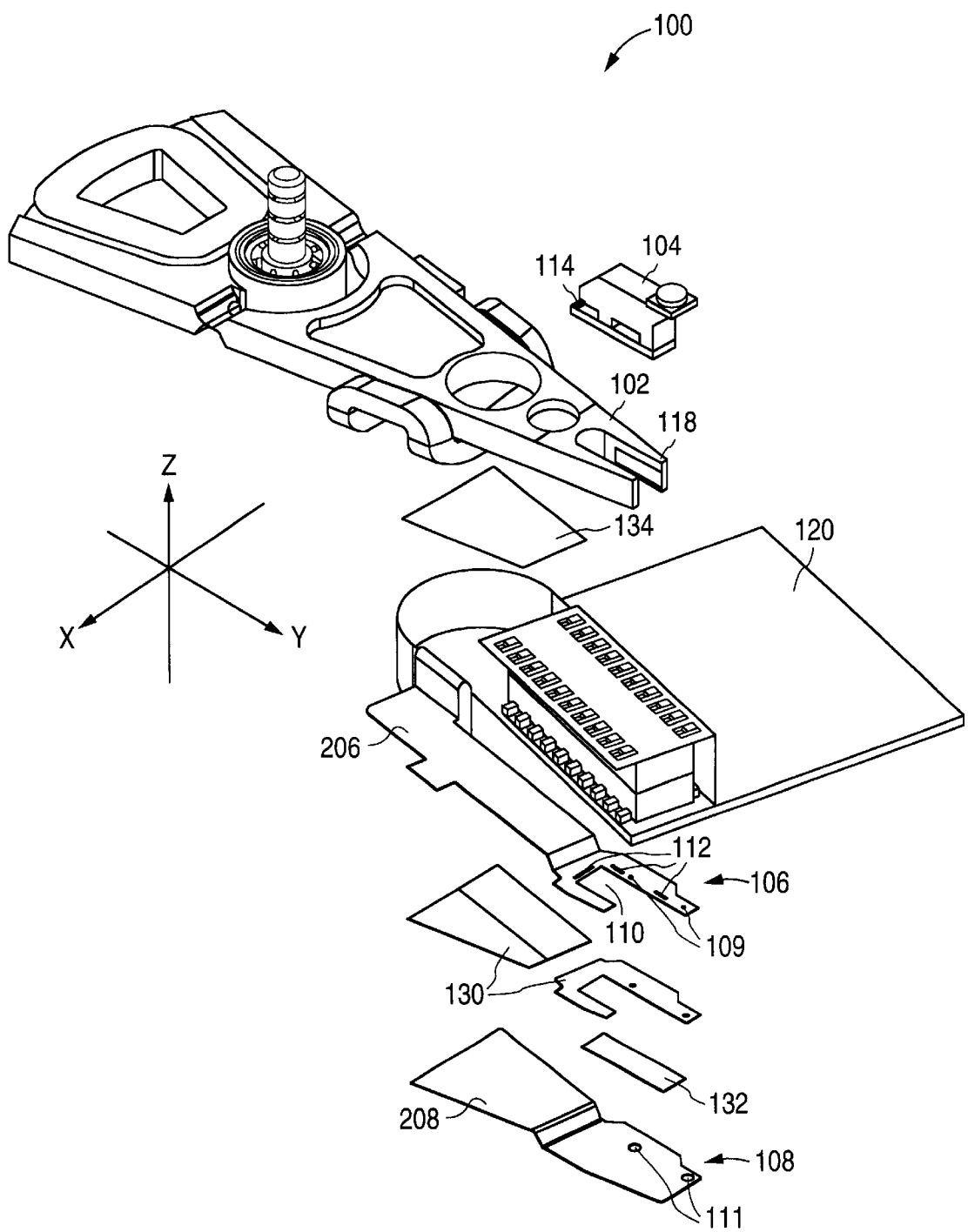
FIG. 2A illustrates an exploded view of an optical assembly in one embodiment.
Figure 2B:
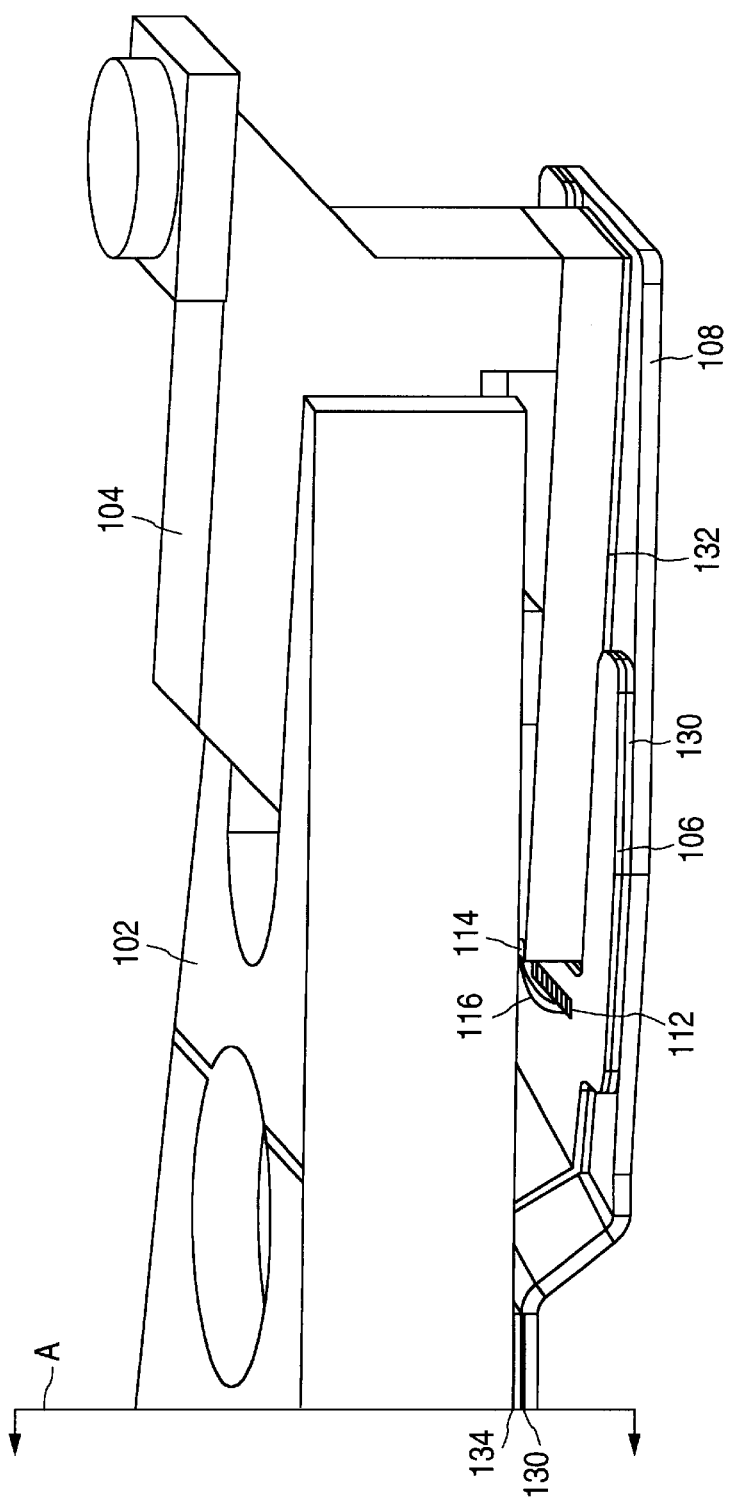
FIG. 2B illustrates a perspective side view of the assembly of FIG. 2A.

FIGS. 2A and 2B illustrate an optical pickup assembly 100 in one embodiment. Assembly 100 includes an actuator arm 102 that places an optical pickup unit (OPU) 104 over the tracks of a spinning medium 330 (shown in FIG. 3). OPU 104 reflects a light beam off the tracks and converts the reflected light beam into electrical signals. A flexible circuit (flex circuit) 106 receives the electrical signals via a direct wire bond 116 to OPU 104 (shown in FIG. 2B), thereby eliminating the use of an intermediate fiberglass layer and its associated wire bonds. Flex circuit 106 passes the electrical signals to a printed circuit board 120 (or any other electronics) for further processing. Flex circuit 106 also passes control and power signals from printed circuit board 120 to OPU 104. A thermally conductive plate (heat sink) 108 is mounted to OPU 104 to dissipate heat generated by OPU 104 to the surroundings (e.g., the surrounding air and components).

As shown in FIG. 2B, flex circuit 106 is mounted atop plate 108. Plate 108 can be made from various thermally conductive materials including aluminum, brass, carbon fiber composite, copper, gold, graphite, steel (stainless or otherwise with anti-corrosion treatment). One skilled in the art understands that plate 108 can also be made from alloys of the metals listed above. Flex circuit 106 is, for example, a conventional Kapton flex circuit with gold or copper traces. In some embodiments, flex circuit 106 is bonded to plate 108 using a thermally conductive adhesive 130. Adhesive 130 includes pressure sensitive adhesives, acrylic adhesives, epoxies, structural epoxies, anaerobic adhesives, UV curable adhesives, gap filling adhesives, and wicking adhesives. Adhesive 130 may include a filler for thermal and/or electrical conductivity purposes (e.g., metal powders, metal fibers, carbon powders, and carbon fibers). In some implementations, flex circuit 106 and plate 108 are manufactured with respective alignment holes 109 and 111 (FIG. 2A) to properly position flex circuit 106 with respect to plate 108 during mounting. Flex circuit 106 and plate 108 are properly positioned when corresponding alignment holes 109 and 111 are aligned.

In some embodiments, flex circuit 106 includes a cutout 110 (FIG. 2A). In these embodiments, OPU 104 is mounted atop plate 108 through cutout 110. OPU 104 is, for example, bonded to plate 108 using a thermally conductive adhesive 132. Thus, OPU 104 is fixedly attached to plate 108 and in a fixed position relative to flex circuit 106.

Figure 3:
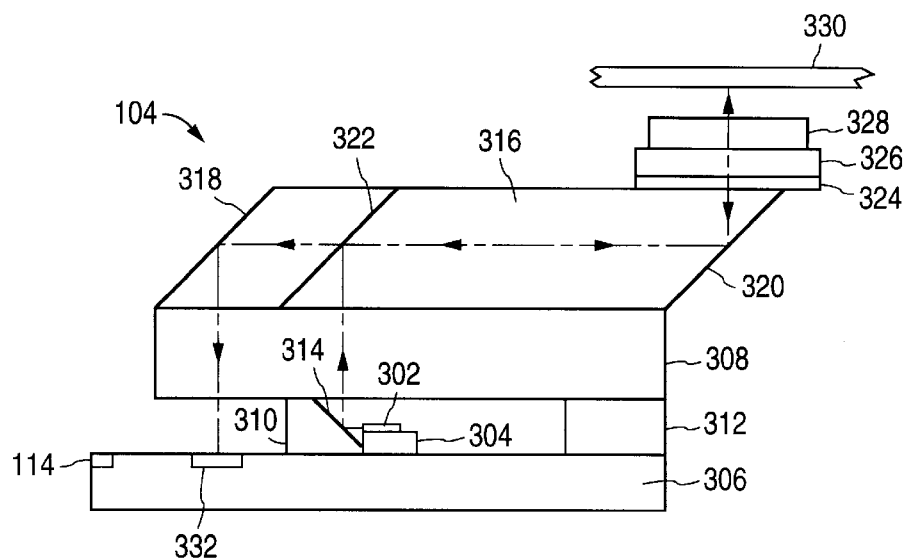
FIG. 3 illustrates a side view of an optical pickup unit (OPU) of the assembly of FIG. 2A.

As shown in FIG. 3, OPU 104 includes a light source 302 supported on a mount 304. Light source 302 is, for example, an edge-emitting laser diode. Mount 304 in turn is mounted on a sub-mount (wafer) 306. Sub-mount 306 is an integrated circuit chip formed in a semiconductor fabrication process to include photodetectors 332 for reading data and controlling the laser power and the servomechanism, and pads 114 and traces for wire bonding photodetectors 332, laser 302, and an optional oscillator chip (not shown) used to modulate laser 302.

Above light source 302 is an OE (optical element) block 308, which can include lenses, gratings, holograms and other optical components or devices. OE block 308 diffracts a fraction of the laser light to laser power control photodetectors (not shown) and optionally shapes the laser beam. Interposed between sub-mount 306 and OE block 308 are spacer blocks 310 and 312 where one side of spacer block 310 is provided with a 45 degrees turning mirror 314 that reflects the horizontal light beam produced by light source 302 to a vertical upward direction.

Mounted atop OE block 308 is a prism 316 made of a material that is transparent to the light beam emitted by light source 302. Prism 316 is, for example, made of fused silica or flint glass (SF2). The ends (lateral surfaces) of prism 316 are angled at about 45 degrees to the horizontal and are coated with a substantially reflective coating such as aluminum or silver to form turning mirrors 318 and 320. Prism 316 also includes an internal polarization beam splitter surface (half mirror) 322 angled at about 45 degrees with respect to the horizontal. Beam splitter surface 322 is substantially reflective (i.e., acts as a mirror) for light of a first polarization and substantially transmissive for light of a second polarization.

Mounted atop prism 316 are a quarter-wave plate 324, a lens spacer 326 and an objective lens 328. Also shown in FIG. 3 is a section of an optical medium 330 positioned at a predetermined distance from objective lens 328. As in conventional optical head units, the light beam emitted by light source 302 follows a forward path to optical medium 330, where it is reflected along a return path to photodetectors 332 in sub-mount 306.

In some embodiments, sub-mount 306 is first mounted atop plate 108 through cutout 110 of flex circuit 106. A precision optical alignment tool can be used to position sub-mount 306 relative to plate 108 via tooling holes or reference surfaces formed in sub-mount 306 and plate 108. Subsequently, the other components of OPU 104 described above are mounted atop sub-mount 306. Again, a precision optical alignment tool can be used to position the components of OPU 104 during the assembly process. Additional details concerning OPU 104 are described in application Ser. No. 09/457,104, filed Dec. 7, 1999, entitled "Low Profile Optical Head", and application Ser. No. 09/544,370, Apr. 6, 2000, entitled "System and Method For Aligning Components of Optical Head", which are incorporated by reference herein in their entirety.

Referring back to FIGS. 2A and 2B, flex circuit 106 and OPU 104 include respective contact pads 112 and 114 for passing and receiving electrical signals via bond wires 116. Traces on flex circuit 106 are used to carry data, control, and power signals between OPU 104 and printed circuit board 120 of the optical drive. Thus, bond wires 116 provides direct connection between flex circuit 106 and OPU 104.

The use of the direct wire bond between OPU 104 and flex circuit 106 increases interconnection reliability because there are no wire bonds to an intermediate layers (e.g., fiberglass layer 40 in FIG. 1) that can break. The use of the direct wire bond also helps to eliminate the intermediate layer, thereby conserving the overall weight and volume of the miniature optical drive. The elimination of the intermediate layer further conserves the weight of OPU 104 so that it can be easily manipulated by actuator arm 102.

Referring to FIG. 2A, OPU 104 is mounted to a fork 118 of actuator arm 102. OPU 104 is, for example, bonded to fork 118 using a thermally conductive adhesive. In some embodiments, OPU 104 is placed in its mounting position by locating one or more edges of sub-mount 306, OE block 308, or prism 316 with respect to the mating surface on actuator arm 102 in the x and y directions, and by locating the top surface of flex circuit 106 or plate 108 relative to the mating surface on actuator arm 102 in the z direction. Portions of plate 108 and flex circuit 106 are mounted to the bottom surface of actuator arm 102. For example, part 208 of plate 108 and part 206 of flex circuit 106 are bonded to the bottom surface of actuator arm 102 using a thermally conductive adhesive 134. As plate 108 and flex circuit 106 are mounted to OPU 104, they are properly positioned with respect to actuator arm 102 when OPU 104 is mounted to fork 118.

Figure 4A:
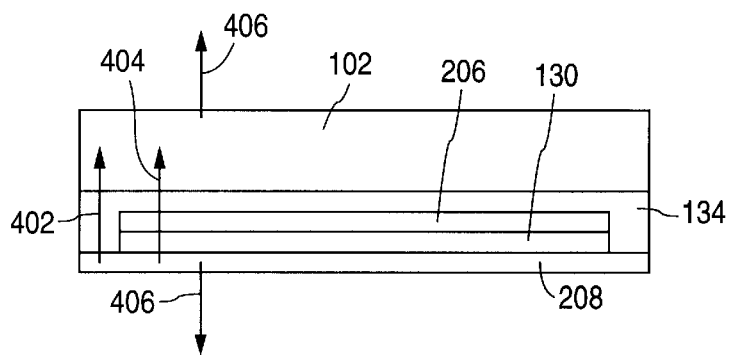
FIGS. 4A, 4B, 5A, and 5B illustrate cross sectional views of the assembly of FIG. 2A in various implementations.
Figure 4B:
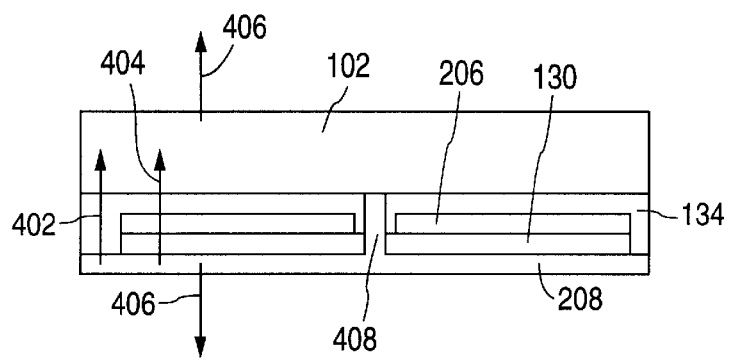

In some implementations, part 206 has a different shape than part 208 and a portion of part 208 is covered by part 206 when part 206 is mounted atop part 208. In these embodiments, thermally conductive adhesive 134 is applied over part 206 and the uncovered portion of part 208. FIG. 4A is a cross-sectional view of one implementation of assembly 100 along a line A (FIG. 2B). As shown in FIG. 4A, thermally conductive adhesive 134 provides a path 402 of thermal conduction between the uncovered portion of part 208 and actuator arm 102 when part 208 is bonded to the bottom surface of actuator arm 102. Of course, heat is also conducted by a path 404 between the covered portion of part 208 and actuator arm 102 through part 206. By forming conductive paths from OPU 104 to part 208 and actuator arm 102, heat can dissipate to the surroundings through the surface area of plate 208 and actuator arm 102 (e.g., shown as paths 406). In one implementation illustrated in FIG. 4B, plate 208 (or any other portion of plate 108) may be provided with one or more protrusions or tabs 408 that pass through cutouts in part 206 (or any other portion of flex circuit 106) to directly contact actuator arm 102 in order to provide additional conduction paths between plate 108 and actuator arm 102.

Figure 5A:
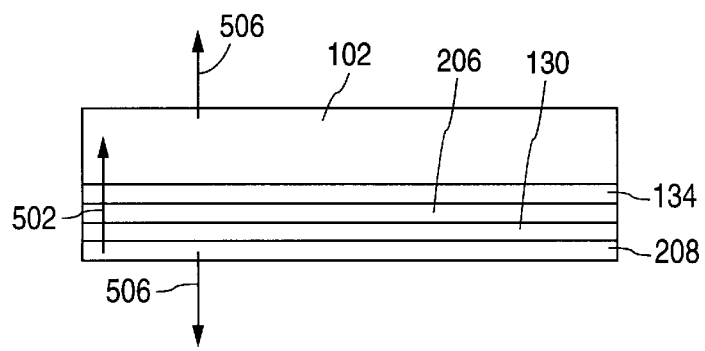
Figure 5B:
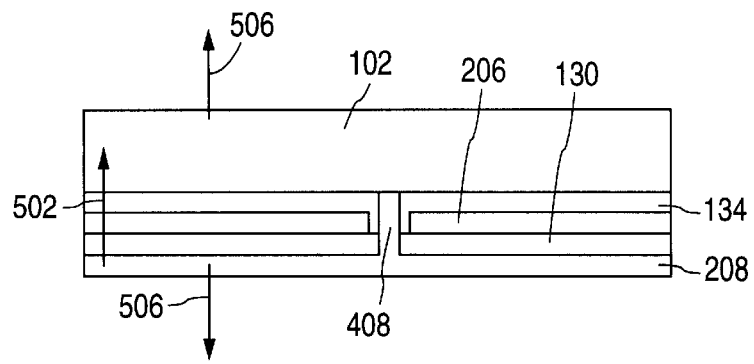

In other implementations, part 206 has a shape such that the entire part 208 is covered by part 206 when part 206 is mounted atop part 208. FIG. 5A is a cross-sectional view of one implementation of assembly 100 along a line A (FIG. 2B). As shown in FIG. 5A, part 208 only contacts actuator arm 102 through part 206. Thus, heat from OPU 104 can be conducted in a path 502 from part 208 of plate 108 through part 206 of flex circuit 106 into actuator arm 102. By forming conductive paths from OPU 104 to plate 108 and actuator arm 102, heat can dissipate to the surroundings through the surface area of plate 108 and actuator arm 102 (e.g., shown as paths 506). In one implementation illustrated in FIG. 5B, plate 208 (or any other portion of plate 108) may be provided with one or more protrusions or tabs 408 that pass through cutouts in part 206 (or any other portion of flex circuit 106) to directly contact actuator arm 102 in order to provide additional conduction paths between plate 108 and actuator arm 102.

Figure 6:
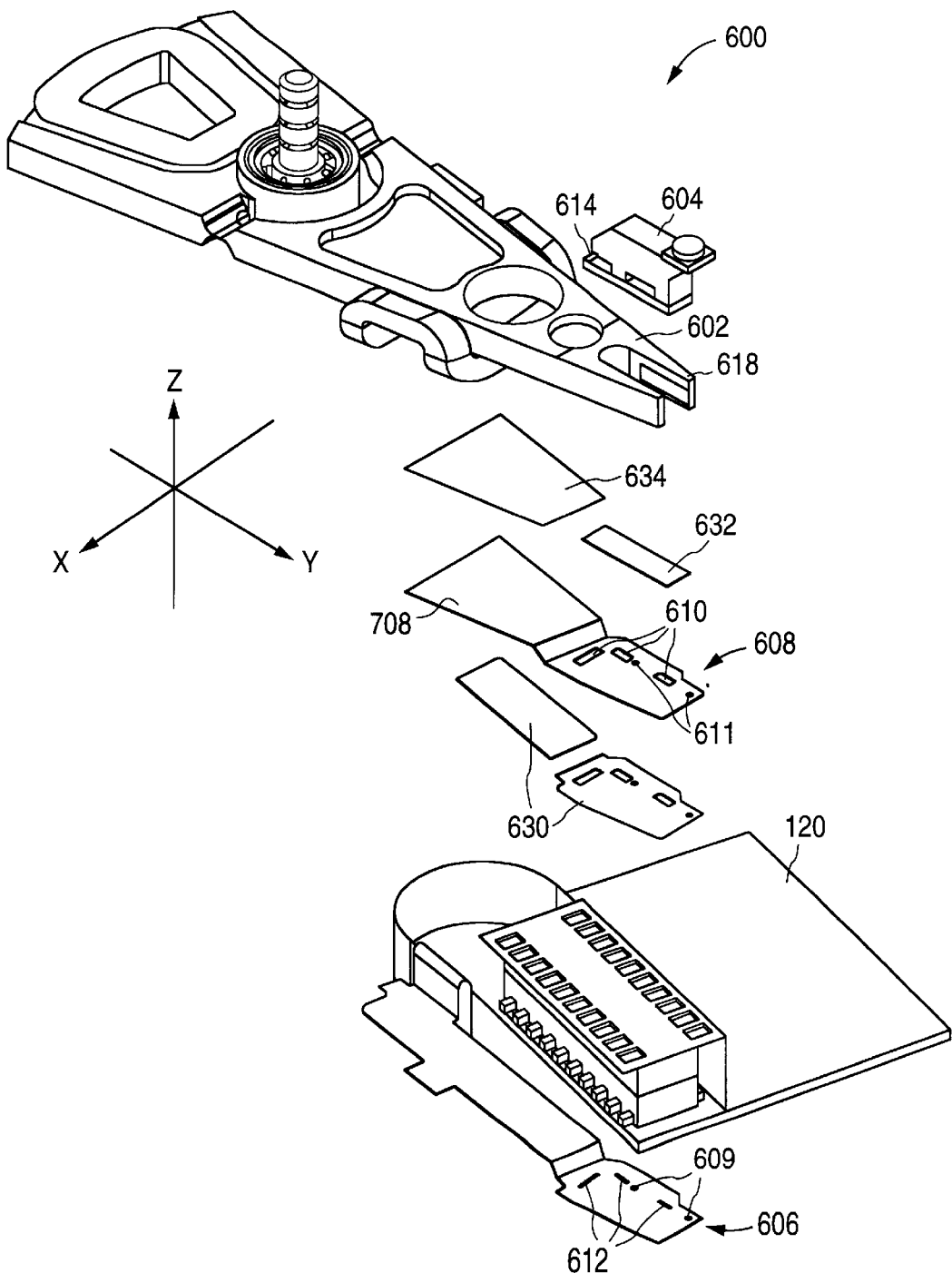
FIG. 6 illustrates an exploded view of an optical assembly in another embodiment.
Figure 7:
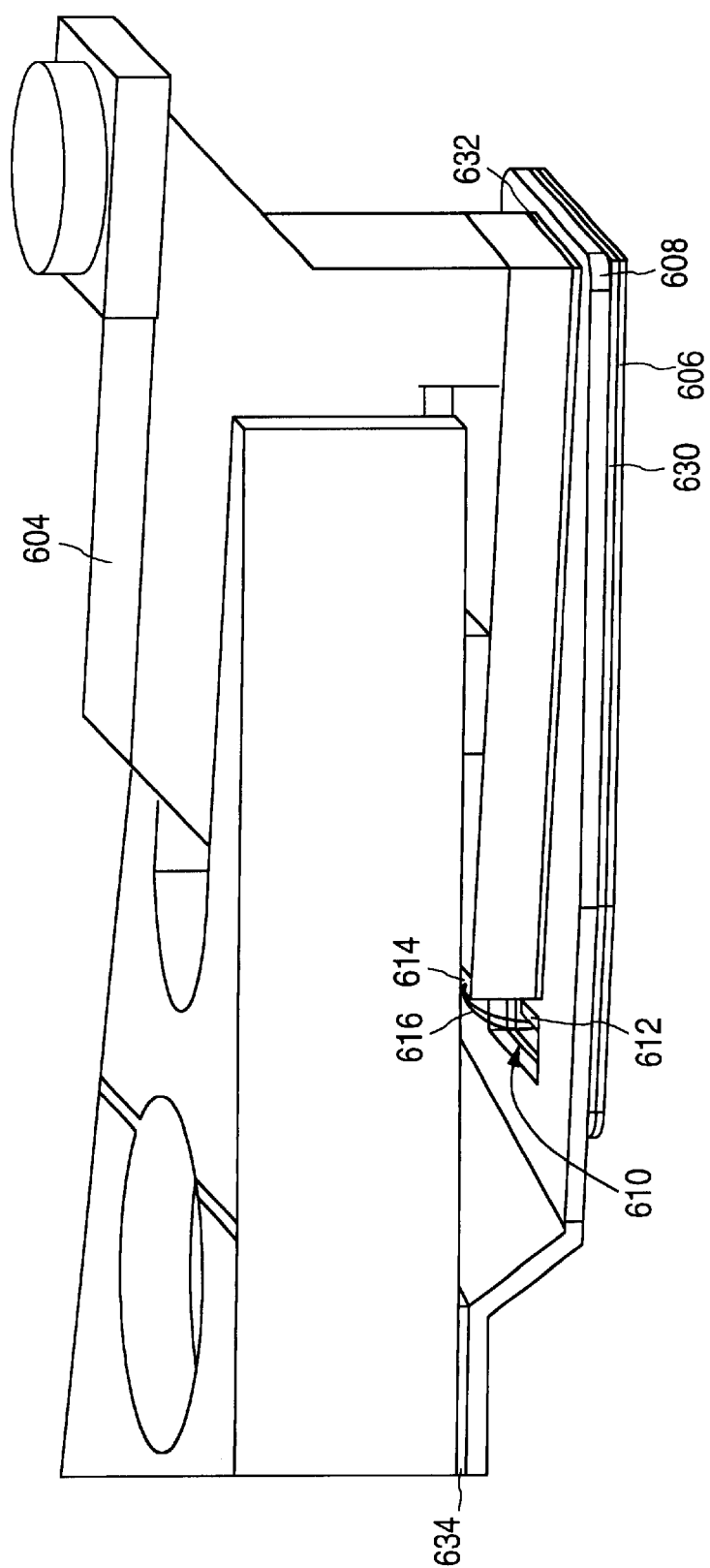
FIG. 7 illustrates a side view of the assembly of FIG. 6.

FIGS. 6 and 7 illustrate an optical pickup assembly 600 in another embodiment. Although similar to optical pickup assembly 100, the elements of optical pickup assembly 600 are arranged differently. A thermally conductive plate 608 is first mounted atop a flex circuit 606. Plate 608 is, for example, bonded atop flex circuit 606 using a thermally conductive adhesive 630. In some embodiments, flex circuit 606 and plate 608 are manufactured with respective alignment holes 609 and 611 to properly position flex circuit 606 with reference to plate 608 during mounting.

An OPU 604 is next mounted atop plate 608. OPU 604 is, for example, bonded to plate 608 using a thermally conductive adhesive 632. Thus, OPU 604 is fixedly attached to plate 608 and in a fixed position relative to flex circuit 606. In some implementations, OPU 604 is constructed like OPU 104.

Flex circuit 606 and OPU 604 include respective contact pads 612 and 614 for passing and receiving electrical signals via bond wires 616 (FIG. 7). In some embodiments, plate 608 includes cutouts 610 where bond wires 616 pass through to couple contact pads 612 and 614. Traces on flex circuit 606 are used to carry data, control, and power signals between OPU 604 and printed circuit board 120 of the optical drive.

OPU 604 is mounted to a fork 618 of an actuator arm 602. OPU 604 is, for example, bonded to fork 618 using a thermally conductive adhesive. Plate 608, with flex circuit 606 attached, is mounted to the bottom surface of actuator arm 602. For example, part 708 of plate 608 is bonded to the bottom surface of actuator arm 602 using a thermally conductive adhesive 634. OPU 604, flex circuit 606, and plate 608 may be positioned relative to each other as described above in respect to assembly 100.

Figure 8:
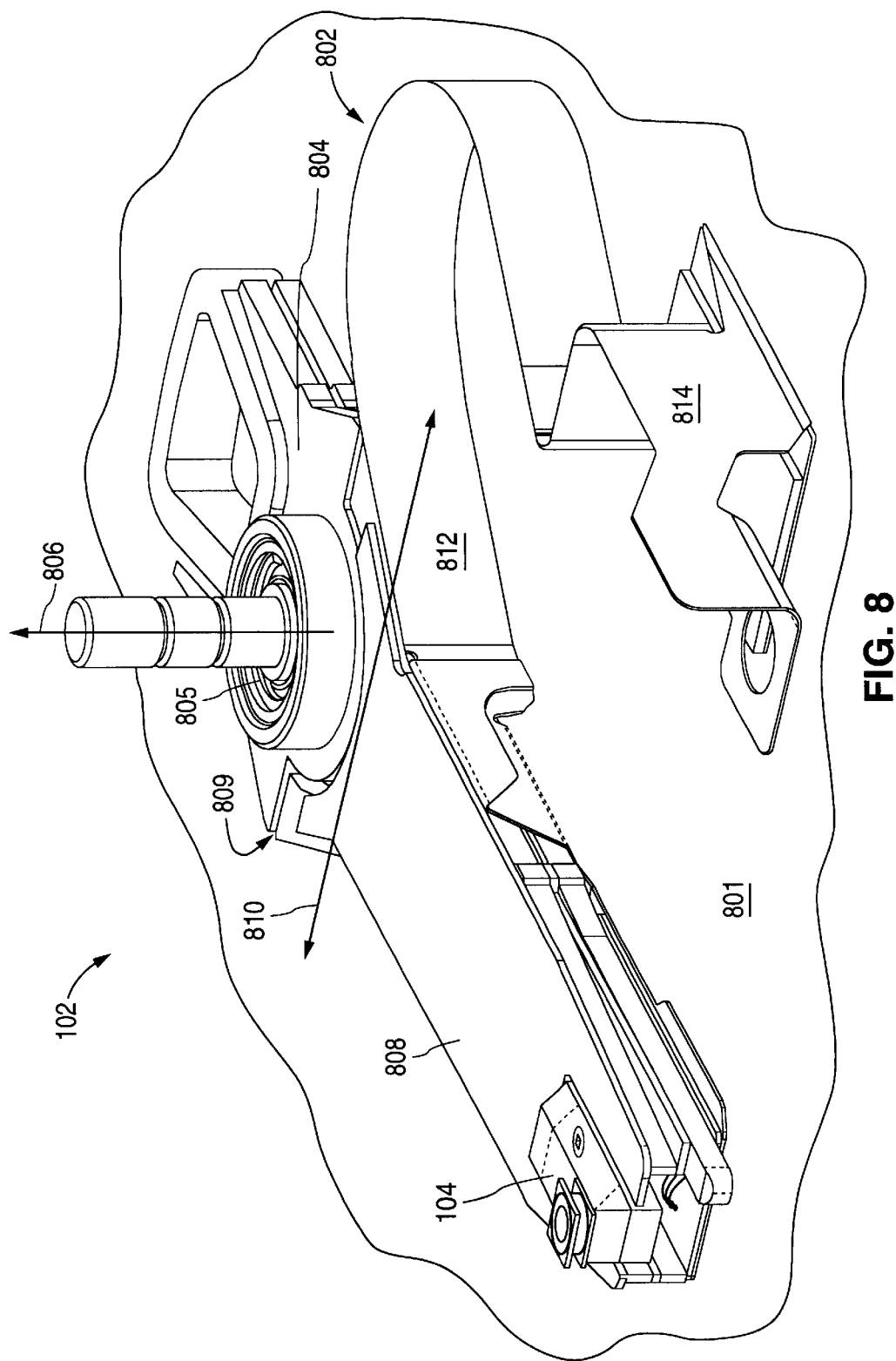
FIG. 8 illustrates a perspective side view of an arm and a service loop of a flex circuit of an optical assembly.

FIG. 8 illustrates that actuator arm 102 includes a tracking section 804 pivotally mounted around a tracking axis 806 to a base plate 801. Tracking section 804 is, e.g., mounted to base plate 801 through a bearing set 805. A focus section 808 is pivotally mounted around a focus axis 810 to tracking section 804. Focus section 808 is, e.g., engaged to tracking section 804 through a hinge 809. OPU 104 is mounted at an end of focus section 808. Tracking section 804 rotates around tracking axis 806 to place OPU 104 over the tracks of medium 330 (not shown) while focus section 808 rotates around focus axis 810 to focus OPU 104 on the tracks of medium 330. Depending on the implementation, tracking axis 806 and focus axis 810 can intersect. Additional details concerning arm 102 are described in application Ser. No. 09/557,284, filed Apr. 25, 2000, entitled "TILT FOCUS METHOD AND MECHANISM FOR AN OPTICAL DRIVE", which is incorporated by reference herein in its entirety.

In one implementation, the angle of rotation for tracking section 804 is 10 to 20 degrees in either direction (clockwise or counterclockwise) while the angle of rotation for focus section 808 is 0.25 to 1.5 degrees in either direction (up or down). In one implementation, the distance from tracking axis 806 to the objective lens of OPU 104 is 10 to 30 mm while the distance from focus axis 810 to the object lens of OPU 104 is 10 to 30 mm.

Figure 12:
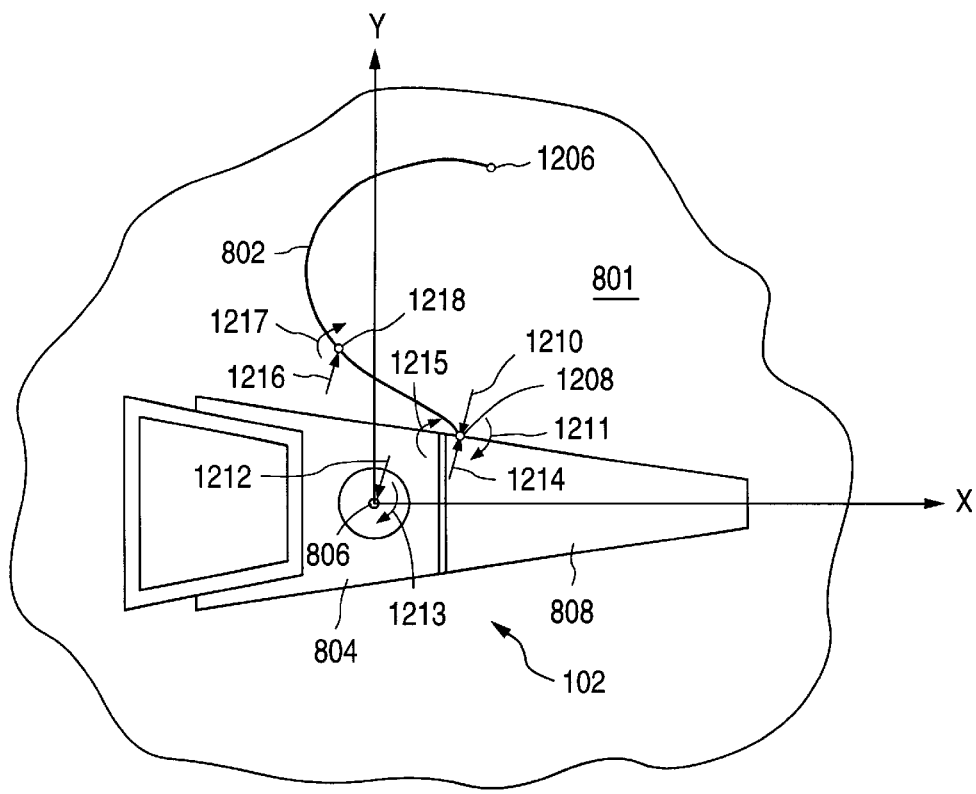
FIG. 12 illustrates a top view of the actuator arm and the flex circuit used to explain the method of FIG. 11.

A service loop 802 of flex circuit 106 extends from arm 102. Service loop 802 includes a proximate end 812 that extends from a departure point 1208 (see FIGS. 9A, 9B, and 12) near axes 806 and 810. In one implementation, proximate end 812 extends from departure point 1208 on focus section 808. In some implementations, multiple service loops 802 can extend from arm 102. Multiple service loops 802 may be necessary due to the number of signals to and from actuator arm 102 and the physical restraints imposed by the dimensions of the optical disk drive.

A distal end 814 of loop 802 is fixedly mounted to base plate 801 at a mounting point 1206 (see FIGS. 9A, 9B, and 12) to cause loop 802 to have a curved shape (e.g., a catenary-like shape). Loop 802 is oriented so that its width (flex width) is vertical when focus section 808 is level.

Figure 9A:
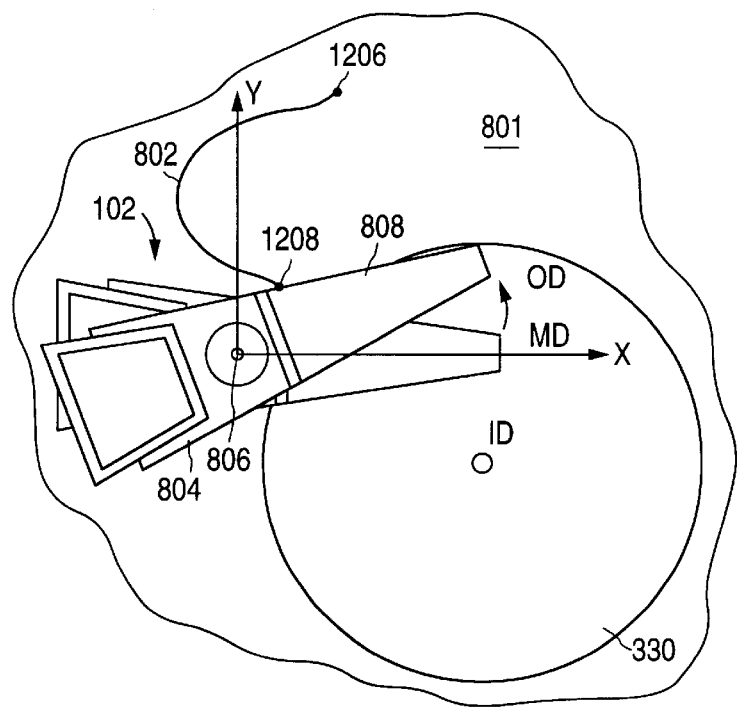
FIGS. 9A and 9B illustrate perspective views of the bending of the service loop when the arm rotates clockwise and counterclockwise.
Figure 9B:
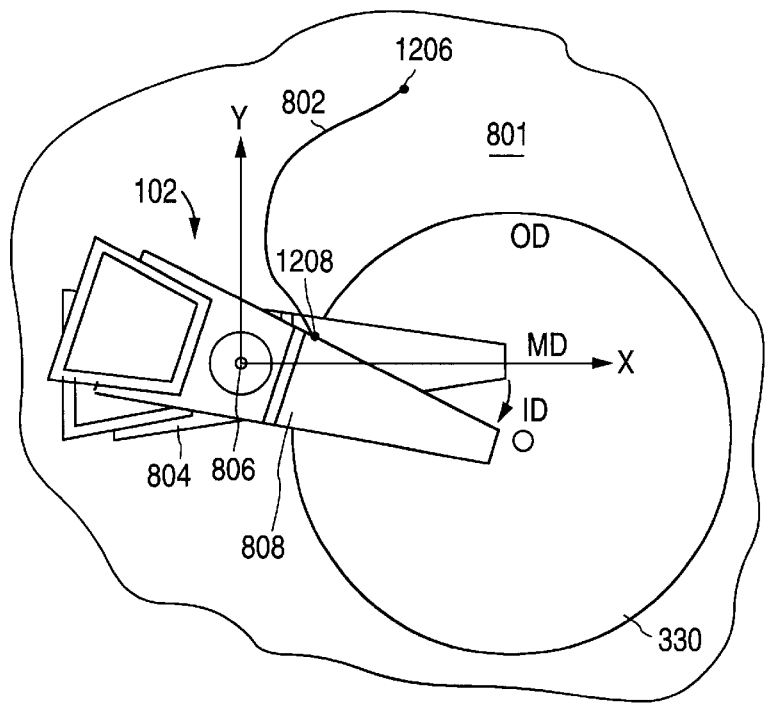

FIGS. 9A and 9B illustrate that loop 802 bends and unbends when tracking section 804 rotates around tracking axis 806 in a first and a second direction, respectively. Loop 802 is preferably made of a material that has a low modulus of elasticity. Loop 802 is, e.g., made of polyimide such as a conventional Kapton flex circuit. The length of loop 802 is relatively large compared to its width and thickness. In one implementation, loop 802 is 26 mm long, 2.5 mm wide, and 0.07 mm thick. These characteristics allow loop 802 to bend easily (e.g., loop 802 has a low bending spring constant). Thus, loop 802 provides minimal constraint to the rotation of tracking section 804 around tracking axis 806.

Proximate end 812 is also attached to arm 102 near tracking axis 806. The placement of departure point 1208 gives loop 802 little mechanical advantage to exert a force on arm 102. Thus, loop 802 does not disturb the motion of tracking section 804 around tracking axis 806.

Figure 10A:
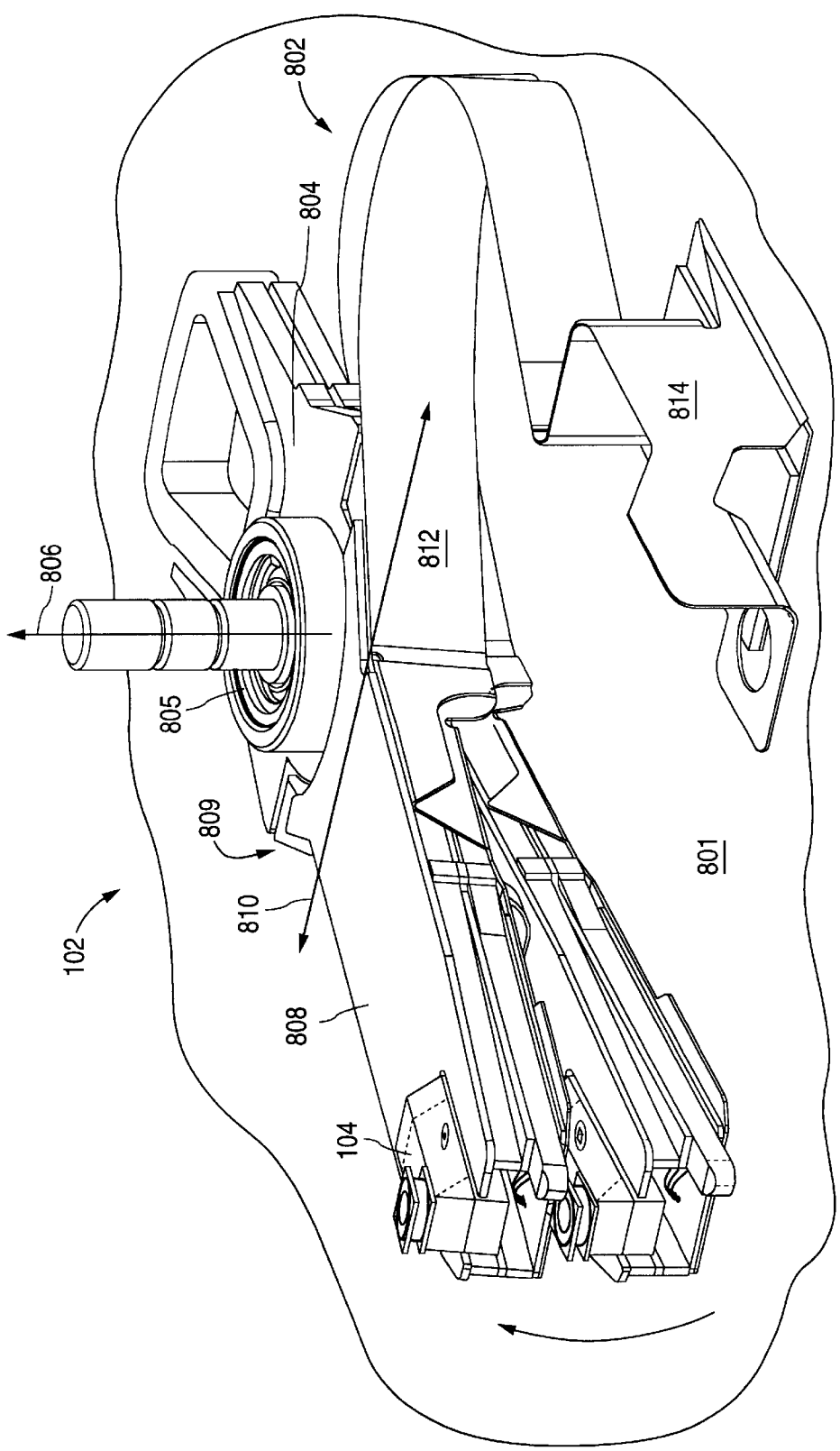
FIGS. 10A and 10B illustrate perspective views of the twisting of the service loop when the arm rotates up and down.
Figure 10B:
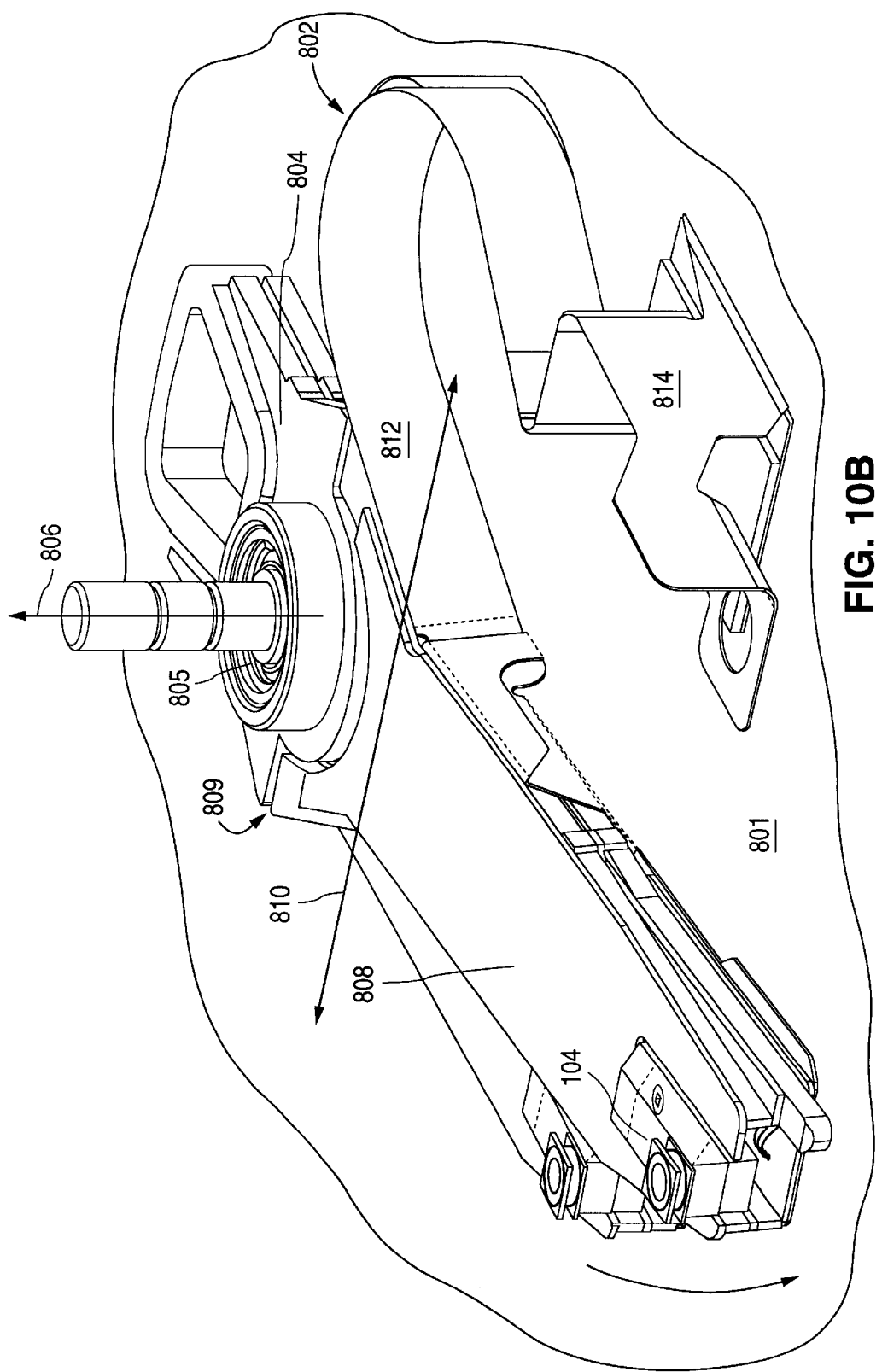

FIG. 10A illustrates how loop 802 twists when focus section 808 rotates around focus axis 810 in a first direction (e.g., up). When section 808 rotates up, proximate end 812 is raised while distal end 814 remains stationary. The movement of proximate end 812 twists loop 802. Similarly, FIG. 10B illustrates how loop 802 twists when focus section 808 rotates around focus axis 810 in a second and opposite direction. When focus section 808 rotates down, proximate end 812 is lowered while distal end 814 remains stationary. Again, the movement of proximate end 812 twists loop 802.

As described before, loop 802 preferably has a low modulus of elasticity and is relatively long. These characteristics allow loop 802 to twist easily (e.g., loop 802 has a low torsional spring constant). Thus, loop 802 does not constrain the rotation of focus section 808 around focus axis 810.

Proximate end 812 is also attached to arm 102 near focus axis 810. The placement of departure point 1208 gives loop 802 little mechanical advantage to exert a force on arm 102. Thus, loop 802 does not disturb the motion of focus section 808 around focus axis 810.

Figure 11:
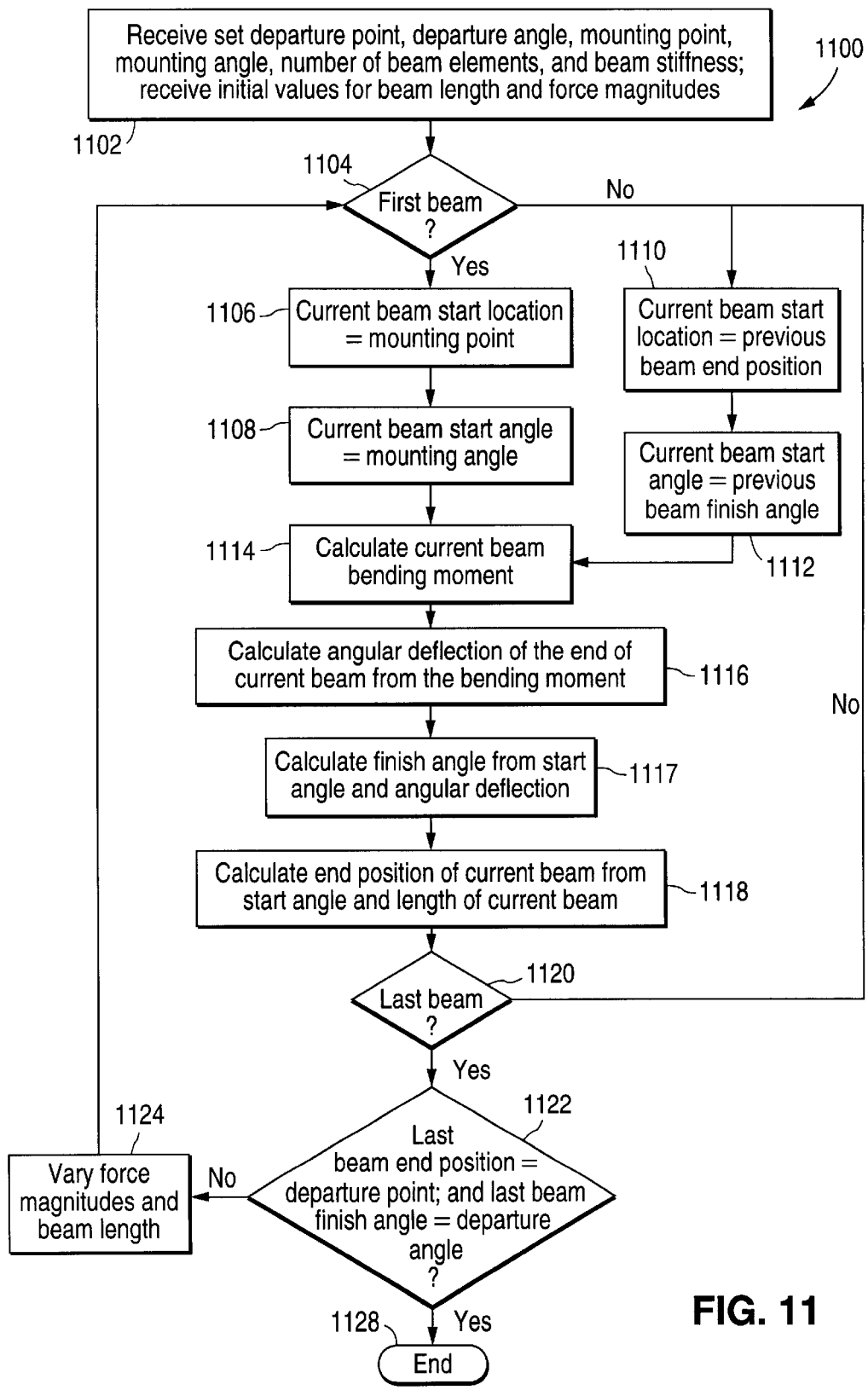
FIG. 11 illustrates a flow chart of a method for determining departure and mounting points of the service loop that do not cause the service loop to rotate the actuator arm away from a resting position in accordance with one embodiment of the invention.

FIG. 11 shows a flow chart of a method 1100 used to determine a shape of service loop 802 that does not rotate actuator arm 102 away from a predetermined position ("resting position") over medium 330. The resting position is selected so that the tracking motor current required to rotate actuator arm 102 toward the inner diameter (ID) against service loop 802 is substantially equal to the tracking motor current required to rotate actuator arm 102 toward the outer diameter (OD) against service loop 802. This minimizes the maximum current and maximum motor torque requirement for the tracking motor in the optical drive. In one implementation, the resting position places actuator arm 102 over the middle diameter (MD) on medium 330 (see FIGS. 9A and 9B).

Method 1100 starts a first end of service loop 802 at a predetermined point ("mounting point") and angle ("mounting angle"). Method 1100 extends service loop 802 out in short sections to meet actuator arm 102 at a predetermined point ("departure point") and angle ("departure angle"). Method 1100 treats each section as a simple beam element deflected by a force and moment applied to the end of said element under simple beam theory. By placing together many short beam elements, method 1100 is able to accurately predict the shape of service loop 802.

As one skilled in the art understands, a force 1210 (FIG. 12) and a rotational moment 1211 applied by service loop 802 to actuator arm 102 at departure point 1208 can be replaced by an equivalent force and moment applied to any point on actuator 102 (e.g., force 1212 and moment 1213 at tracking axis 806). The magnitude and direction of force 1212 are constant while the magnitude and sign of moment 1213 will depend on the location of the chosen point. Method 1100 assumes that equivalent force 1212 and moment 1213 at tracking axis 806 consist of the constant force 1212 and a zero (0) value moment 1213 such that the combined effect of the two does not tend to rotate actuator arm 102 about tracking axis 806.

For the purposes of calculating deflections of the simple beam elements which together comprise service loop 802, a force 1214 and a rotational moment 1215 applied by actuator arm 102 to service loop 802 at departure point 1208 can be replaced by an equivalent force and moment applied to any point on service loop 802 (e.g., equivalent force 1216 and moment 1217 at point 1218). Force 1216 applied to service loop 802 at the location of any chosen simple beam element will be equal in magnitude and opposite in direction when compared with force 1212. Moment 1217 applied to a chosen beam element can be calculated from force 1216 and the location of the simple beam element on service loop 802 chosen. Force 1216 and calculated moment 1217 applied to a chosen beam element in service loop 802 will cause the element to deflect. The complete curve of service loop 802 can thus be determined by calculating the deflection caused by force 1216 and calculated moment 1217 for each beam element in service loop 802.

Method 1100 begins at the first end of service loop 802 and determines the deflection of the first comprising beam element by applying to said element force 1216 and calculated moment 1217. Said deflected beam element is connected to the predetermined mounting point at the predetermined mounting angle. Method 1100 calculates the deflection of each beam element, connects said element to the second end of an immediately preceding beam element and sequentially repeats this process for each simple beam element comprising service loop 802.

Further, method 1100 adjusts the magnitude and direction of force 1216 (e.g., by varying the magnitudes of the X and Y components of force 1216) and the common length of the individual simple beam elements ("beam length") which together comprise service loop 802 to values that are consistent with the mechanical dimensions and characteristics of the material(s) constituting the service loop and the predetermined mounting point, mounting angle, departure point, and departure angle.

Generally, a user sets (1) the departure point (e.g., X and Y coordinates), (2) the departure angle, (3) the mounting point (e.g., X and Y coordinates), (4) the number of beam elements used to simulate service loop 802, and (5) the bending modulus of the beam elements (e.g., stiffness of service loop 802). The user also provides initial values for (6) the beam length and (7) the magnitudes of the X and Y components of force 1216. The initial values provided for the beam length and the magnitudes of the X and Y components are only guesses. A computer can vary one or more of the beam length and the magnitudes of the X and Y components in an iterative process to achieve a solution that places the end of service loop 802 at the predetermined departure point and angle. Typically, a large number of beam elements and a small beam length will produce an accurate prediction of the shape of service loop 802. One implementation of method 1100 as a MATLAB™ computer program is provided in the CD-ROM Appendix. MATLAB™ is available from MathWorks of Natick, Mass.

Method 1100 starts in action 1102 (FIG. 11). In action 1102, a user sets the departure point, the departure angle, the mounting point, the mounting angle, the number of beam elements, and beam stiffness. The user also provides initial values for the beam length and the magnitudes of the X and Y components of force 1216.

In action 1104, the computer determines if the beam element of the current iteration ("current beam element") is the first beam element. If so, action 1104 is followed by action 1106. Otherwise, action 1104 is followed by action 1110.

Figure 13:
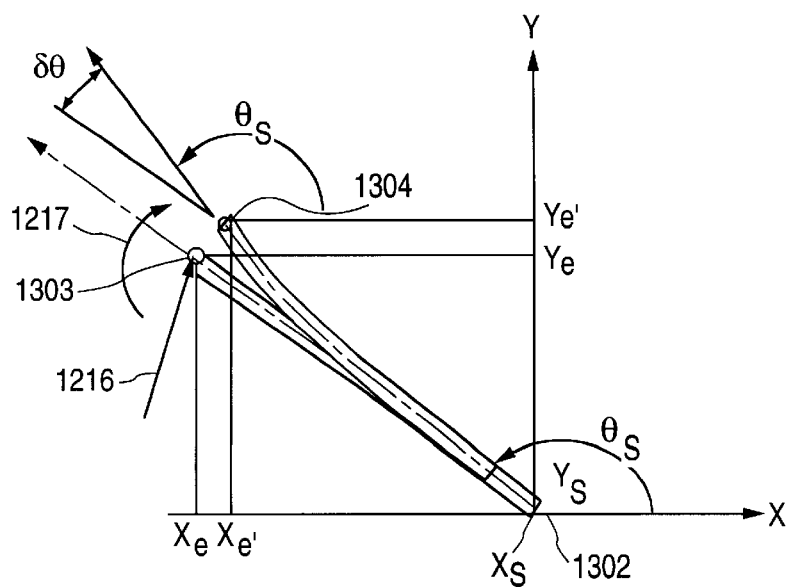
FIG. 13 illustrates one of many beam elements used to predict the shape the service loop in the method of FIG. 12.

In action 1106, the computer sets the mounting point as the start position (e.g., point 1302 in FIG. 13) of the current beam element. In action 1108, the computer sets the angle ("start angle"; e.g., $\theta_s$ in FIG. 13) at which the start of the current beam element is oriented. Actions 1106 and 1108 set mounting point and mounting angle as the start position and the start angle of the first beam element. Action 1108 is followed by action 1114.

In action 1110, the computer sets the end position (e.g., point 1304 in FIG. 13) of the beam element from the previous iteration ("previous beam element") as the start position of the current beam element. In action 1112, the computer sets the finish angle (e.g., $\theta_f$ in FIG. 13) of the beam element from the previous beam element as the start angle (e.g., $\theta_s$ in FIG. 13) of the current beam element. Actions 1110 and 1112 set the end position and the finish angle of the previous beam element as the start position and the start angle of the current beam element. Action 1112 is followed by action 1114.

In action 1114, the computer calculates the bending moment at the end of the current beam element. In one implementation, the bending moment is calculated with the following formula:

$$M_b = -(Y_e - Y_p)F_x + (X_e - X_p)F_y$$

where $X_e$ and $Y_e$ are the coordinates of the end position of the current beam without deflection (e.g., point 1303), $X_p$ and $Y_p$ are the coordinates of the pivot (i.e., tracking axis 806), $(X_e - X_p)$ is the moment arm for the X component, $(Y_e - Y_p)$ is the moment arm for the Y component, and $F_x$ and $F_y$ are the magnitudes of the X and Y components of force 1216.

$X_e$ and $Y_e$ can be calculated with the following formula:

$$X_e = X_s + L \cos(\theta_s)$$

$$Y_e = Y_s + L \sin(\theta_s)$$

where L is the beam length, and $X_s$ and $Y_s$ are the coordinates of the start of the current beam element.

In action 1116, the computer calculates the angular deflection (difference between the start and finish angles) of the current beam element from the bending moment. In one implementation, the beam elements are assumed to be so small that the effects of the X and Y components of force 1216 on the angular deflection are negligible. The formula for angular deflection thus becomes:

$$\partial \theta = \frac{M_b L}{EI}$$

where $\partial \theta$ is the angular deflection and EI is the bending modulus (beam stiffness).

In action 1117, the computer calculates the finish angle of the current beam element from the starting angle and the angular deflection using the following formula:

$$\theta_f = \theta_s \partial \theta.$$

In action 1118, the computer calculates the end position of the current beam element. In one implementation, the beam elements are assumed to be so small that the effects of beam deflection on the end position of an individual beam element are negligible. The formula for the beam end position thus becomes:

$$X_{e'} = X_s + L \cos(\theta_s)$$

$$Y_{e'} = Y_s + L \sin(\theta_s)$$

where $X_{e'}$ and $Y_{e'}$ are the coordinates of the end position of the current beam element with deflection (e.g., point 1304).

In action 1120, the computer decides if the current beam element is the last beam element. If so, action 1120 is followed by action 1122. Otherwise, action 1120 is followed by the previously described action 1110. Thus, the computer cycles through method 1100 until it calculates the end position and the finish angle of the last beam element.

In action 1122, the computer determines if the end position and the finish angle of the last beam element are approximately equal to the departure point and the departure angle. The end position and the finish angle are approximately equal to the departure point and the departure angle if they are within a predetermined tolerance. If not, action 1122 is followed by action 1124. Otherwise, action 1122 is followed by action 1128.

In action 1124, the computer varies at least one of the beam length and the magnitudes of the X and Y components of force 1216. Action 1124 is followed by action 1104, where the computer cycles through method 1100 until it finds values for the beam length and the magnitudes of the X and Y components of force 1216 that produce an end position and a finish angle of the last beam element that are approximately equal to the departure point and the departure angle.

In action 1128, the computer ends method 1100 because it has found a beam length and magnitudes of the X and Y components of force 1216 that place the end position and the finish angle of the last beam element at the departure position and the departure angle. The total length of service loop 802 is the product of the beam length and the total number of beam elements. Service loop 802 does not rotate actuator arm 102 away from its resting position if it conforms to the set mounting point, mounting angle, departure point, departure angle, beam stiffness, and the determined total length.

In the implementation using MATLAB™, method 1100 utilizes a function called "fminsearch" to find the minimum difference between the end position and the finish angle of the last beam element and the predetermined departure point and departure angle by varying at least one of the beam length and the magnitudes of the X and Y components of force 1216.

Figure 14:
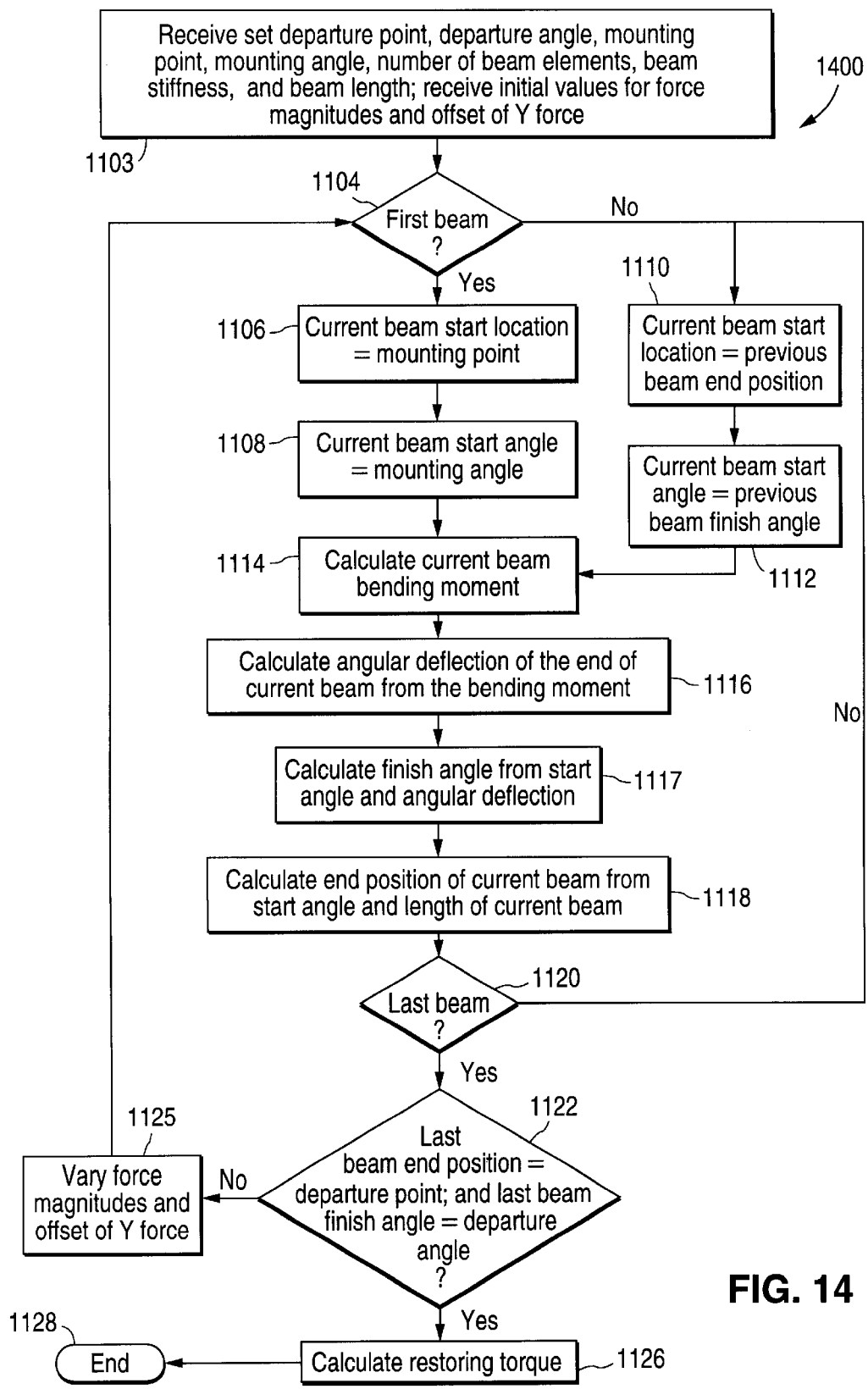
FIG. 14 illustrates a flow chart of a method for determining the torque experienced by the actuator arm from the service loop when the actuator arm is rotated away from the resting position in accordance with one embodiment of the invention.

After determining the shape of service loop 802, a method 1400 (FIG. 14) can be used to calculate moment 1213 ("restoring torque") exerted by service loop 802 against actuator arm 102 when it rotates away from its resting position. The restoring torque can be used to determine if a rotary driver (e.g., a voice coil) has enough power to rotate actuator arm 102 against service loop 802. The restoring torque can also be used to select a resting position for actuator arm 102 that results in equal restoring torque when the actuator arm 102 rotates toward the ID or OD of medium 330. This minimizes the maximum current and maximum motor torque requirement for the tracking motor in the optical drive.

Assuming the restoring torque is not zero, then the moment applied by actuator arm 102 to any point on service loop 802 becomes the sum of the moment generated by force 1216 in each beam element and the restoring torque (i.e., moment 1213). Thus, the bending moment at the end of the current beam element when actuator arm 102 is rotated away from its resting position becomes:

$$M_b = -(Y_e - Y_p)F_x + (X_e - X_p)F_y + M_r,$$

where $M_r$ is the restoring torque.

In one implementation, the restoring torque is represented as a moment generated by the Y component of force 1212 (which has the same magnitude as Y component of force 1216) that is offset from the pivot point (tracking axis 806). Thus, the bending moment to any point on service loop 802 becomes:

$$M_b = -(Y_e - Y_p)F_x + (X_e - X_p)F_y + L_{offset}F_y$$

or $$M_b = -(Y_e - Y_p)F_x + (X_e - X_p + L_{offset})F_y,$$

where $L_{offset}$ is the X direction offset of the Y component from tracking axis 806.

Method 1400 is the same as method 1100 except:

(1) the departure point is moved with actuator arm 102 to the ID or OD of medium 330 (see FIGS. 9A and 9B);

(2) action 1103 (described below) replaces action 1102;

(3) action 1114 uses a new formula (described above) for calculating the bending moment;

(3) action 1125 (described below) replaces action 1124; and (4) action 1126 (described below) is inserted between actions 1122 and 1128 when the end position and the finish angle of the last beam element are approximately equal to the departure point and the departure angle.

In action 1103, the user provides an initial value for the offset of the Y component of force 1216 from tracking axis 806 when actuator arm 102 is located at the ID or OD of medium 330. The user also provides initial values for the magnitudes of the X and Y components of force 1216. The user further sets the mounting point, the mounting angle, the number of beam elements, the beam stiffness, and the beam lengths with the values previously provided and determined in method 1100. The user also sets the departure point and the departure angle when actuator arm 102 is located at the ID or OD of medium 330. In one implementation, the user sets the rotation angle of actuator arm 102 when it is located at the ID or OD and the computer calculates the corresponding departure point and the departure angle from the rotation angle and the physical dimensions of actuator arm 102.

In action 1125, the computer varies at least one of Y component offset and the magnitudes of the X and Y components.

In action 1126, the computer calculates the restoring torque experienced by actuator arm 102. The restoring torque is provided by the following formula:

$$M_r = F_y L_{offset}.$$

One implementation of method 1400 as a MATLAB™ computer program is provided in the CD-ROM Appendix. In the MATLAB™ implementation, method 1400 utilizes the previously mentioned "fminsearch" function to find the minimum difference between the end position and the finish angle of the last beam element and the predetermined departure point and departure angle by varying at least one of the Y component offset and the magnitudes of the X and Y components.

Although the invention has been described with reference to particular embodiments, the description is only an example of the invention's application and should not be taken as a limitation. For example, methods 1100 and 1400 can use the departure point as the starting point of the service loop and the mounting point as the ending point of the service loop. Furthermore, although only three of the input parameters are varied by the computer, a greater or lesser number of input parameters can be varied. Input parameters other than the magnitudes of the X and Y forces and the beam length or the offset of the Y force can be varied. In addition, although specific formulas for calculating moments and deflection are provided, other formulas and permutations can be used to calculate moment and deflection. Various other adaptations and combinations of features of the embodiments disclosed are within the scope of the invention as defined by the following claims.

| File Name | File Size (bytes) | Creation Date |
|---|---|---|
| BETA_S~1.M | 11,122 | 02/07/01 |
| C2P.M | 1,801 | 02/07/01 |
| C3P.M | 2000 | 02/07/01 |
| PERPEN~1.M | 843 | 02/07/01 |
| ROTATE~1.M | 172 | 02/07/01 |

We claim:

1. An optical assembly comprising:
   a base plate, and
   an arm including:
      a first section pivotally mounted around a first axis to the base plate; and
      a second section pivotally mounted around a second axis to the first section; and
   at least one service loop, the at least one service loop including a first end extended from the second section,
   wherein at least a portion of the at least one service loop twists when the second section rotates around the second axis.

2. The assembly of claim 1, wherein the first end extends from a point of the second section close to the first and the second axes.

3. The assembly of claim 2, wherein the point is closer to the second axis than an optical head mounted to the arm.

4. The assembly of claim 1, wherein the width of the service loop is vertical when the second section is in a level position.

5. The assembly of claim 1, wherein the service loop further includes a second end mounted to the base plate.

6. The assembly of claim 1, wherein the first axis is perpendicular to the second axis.

7. The assembly of claim 1, wherein at least a portion of the service loop bends when the first section rotates around the first axis.

8. An optical assembly comprising:
   a base plate;
   an arm including:
      a first section pivotally mounted around a first axis to the base plate; and
      a second section pivotally mounted around a second axis to the base first section;
   one or more service loops, each service loop including:
      a first end extended from the second section; and
      a second end mounted to the base plate; and
   wherein:
      at least a portion of the service loop bends when the first section rotates around the first axis; and
      at least a portion of the service loop twists when the second section rotates around the second axis.

9. An optical assembly comprising:
   a base plate;
   an arm including:
      a first section pivotally mounted around a first axis to the base plate; and
      a second section pivotally mounted around a second axis to the first section;
   at least one service loop, each service loop including a first end extended from the second section; and
   wherein at least a portion of the service loop twists when the second section rotates around the second axis.

10. An optical assembly comprising:
    a base plate;
    an arm mounted to the base plate, the arm being pivotable around a first axis and a second axis; and
    at least one service loop extending from the arm, wherein:
       at least a portion of the service loop bends when the arm rotates around the first axis; and
    at least a portion of the service loop twists when the arm rotates around the second axis.

* * * * *